3,201,312
HEPARIN DERIVATIVES AND METHODS
FOR PREPARING SAME
Robert Bucourt, Clichy-sous-Bois, France, assignor to
Roussel-UCLAF, Paris, France, a corporation of France
No Drawing. Filed Feb. 18, 1964, Ser. No. 345,572
Claims priority, application France, Feb. 26, 1963,
926,058
11 Claims. (Cl. 167—74)

The invention relates to the novel compounds, O-methyl-N-methyl heparinamide and its alkali metal salts, and to a novel process for the preparation. The invention further relates to novel antilipemic compositions devoid of anticoagulant activity and to a novel method of treating hyperlipemia.

Heparine is known to exercise a clarifying activity on hyperlipemic blood serum but it also possesses a strong anticoagulant activity which prevents its use in the treatment of hyperlipemia. Heparinamides such as N-methyl heparinamide described in United States application Serial No. 117,815, filed June 19, 1961, are known to possess antilipemic activity without any significant anticoagulant activity.

It is an object of the invention to provide the novel products, O-methyl-N-methyl heparinamide and its alkali metal salts.

It is another object of the invention to provide a novel process for the preparation of O-methyl-N-methyl heparinamide and its alkali metal salts.

It is a further object of the invention to provide novel antilipemic compositions which are devoid of anticoagulant activity.

It is an additional object of the invention to provide a novel method of treating hyperlipemia.

These and other objects and advantages of the invention will become obvious from the following detailed description.

The novel compounds of the invention are O-methyl-N-methyl heparinamide and its alkali metal salts which have the probable structural formula:

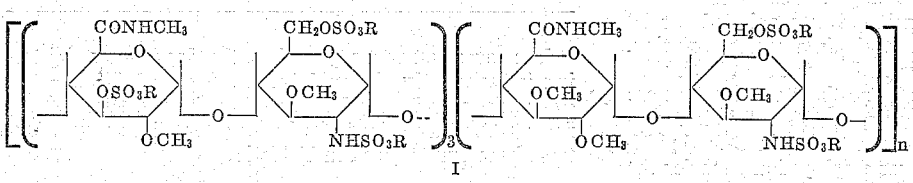

wherein R is selected from the group consisting of hydrogen and an alkali metal. The said products have a clear antilipemic activity and are practically devoid of all anticoagulating activity.

The novel process of the invention for the preparation of O-methyl-N-methyl heparinamide comprises reacting N-methyl heparinamide with a high molecular weight long chain quaternary ammonium compound to form the corresponding quaternary ammonium salt of N-methyl heparinamide and reacting the latter in an inert organic solvent with a methyl halide in the presence of a halide precipitant to form O-methyl-N-methyl heparinamide. The alkali metal salt of O-methyl-N-methyl heparinamide may be formed by reacting the said heparinamide with an alkali metal salt of a lower alkanoic acid.

It is completely unexpected that the methylation reaction does not cause degradation of the heparinamide compound while heparine undergoes a pronounced degradation when methylated. When heparine is subjected to the reaction of the present process, degradation of the glucosamine-glucuronic acid chain occurs according to the following partial flow diagram:

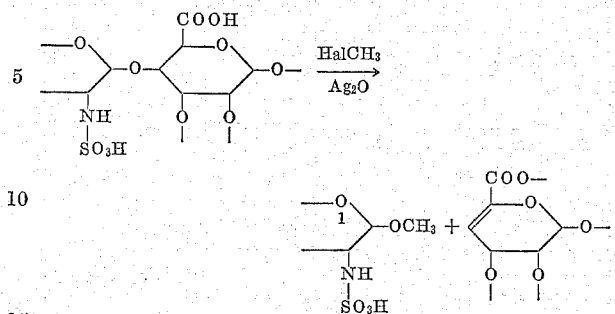

The hydroxyl in the 1-position of the glucosamine is liberated and methylated thereby masking the incomplete methylation. The ultraviolet spectra of methylated heparine in N/100 hydrochloric acid, however, shows a maximum toward 232 mµ which corresponds to a double bond conjugated with a carboxyl of the structure:

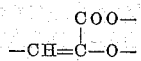

which is a part of the glucuronic acid chain formed by the degradation of heparine. The ultraviolet spectra of the O-methylated N-methyl heparinamide of the invention does not show a maximum at 232 mµ which shows that there is no degradation of the heparinic chain in the said compound. The methylation process of the invention thus proceeds by a different method of reaction than the methylation of heparine.

The high molecular weight long chain quaternary ammonium compounds suitable to form the corresponding salts of N-methyl heparinamide are such as for example benzyldimethyl-2-[2-(p-1,1,3,3-tetramethylbutylphenoxy)-ethoxy]-ethyl ammonium chloride which is also known under the trade name Hyamine 1622, trimethyl-(methyl-dodecylbenzyl)-ammonium chloride, dilauryldimethyl ammonium chloride and other suitable compounds.

A preferred mode of the process of the invention comprises reacting N-methyl heparinamide with aqueous Hyamine 1622 to form the Hyamine 1622 salt of N-methyl heparinamide, reacting the latter in tetrahydrofuran with methyl iodide in the presence of silver oxide to form O-methyl-N-methyl heparinamide, reacting the latter with sodium acetate to form the sodium salt of O-methyl-N-methyl heparinamide and recovering the latter (i.e., by precipitation with an alkanol such as methanol). The said product is usually at least 80% methylated.

As has been stated above, O-methyl-N-methyl heparinamide and its alkali metal salts possess interesting pharmacological properties. They possess particularly a clear antilipemic action. They are practically devoid of all anticoagulating activity which permits treatments of long duration without undesirable secondary effects.

The novel antilipemic compositions of the invention are comprised of a compound selected from the group consisting of O-methyl-N-methyl heparinamide and its alkali metal salts and a major amount of a pharmacological carrier. The said compositions may be in the form of injectable solutions, injectable suspensions, prepared in ampules and in multiple-dose flacons, in the form of tablets, coated tablets, glossettes and suppositories, prepared in the usual manner.

The novel method of treating hyperlipemia comprises administering an effective amount of a compound selected from the group consisting of O-methyl-N-methyl heparinamide and its alkali metal salts. The compounds may be administered orally, perlingually, transcutaneously or rectally, preferably orally which avoids frequent injections. The usual daily dosage is 20 to 200 mg. per day depending upon the method of administration.

N-methyl heparinamide may be prepared according to the process of commonly assigned, copending United States application No. 117,815 which comprises reacting heparine with a high molecular weight long chain quaternary ammonium compound to form the corresponding quaternary ammonium salt of heparine, reacting the latter with a lower alkyl esterification agent to form a lower alkyl ester of heparine, and reacting the latter with monomethylamine to form N-methyl heparinamide.

In the following example there are described several preferred embodiments to illustrate the invention. However, it should be understood that the invention is not intended to be limited to the specific embodiments.

EXAMPLE.—PREPARATION OF THE SODIUM SALT OF O-METHYL-N-METHYL HEPARINAMIDE

*Step A: Preparation of the Hyamine 1622 salt of N-methyl heparinamide.*—5 grams of the sodium salt of N-methyl heparinamide were dissolved in 25 cc. of water in a balloon flask and 100 cc. of a 10% aqueous solution of Hyamine 1622 were added thereto. The hyamine salt precipitated and the reaction mixture was allowed to stand for one hour. The suspension was filtered, washed with water and dried under vacuum to obtain 12.67 gm. of the Hyamine 1622 salt of N-methyl heparinamide which was identical to the compound described in copending United States application No. 117,815.

*Step B: Preparation of O-methyl-N-methyl heparinamide.*—In a balloon flask having three necks, 3 gm. of the Hyamine 1622 salt of N-methyl heparinamide prepared in Step A were dissolved in 30 cc. of tetrahydrofuran and dissolution was effected in about 45 minutes to one hour. The reaction mixture was brought to +3° C. and 15 cc. methyl iodide and 22.5 gm. of silver oxide were added. Then the reaction mixture was agitated for 72 hours at +3° C. and filtered to obtain a reddish solution. The insoluble residue was washed three times, each time with 10 cc. of tetrahydrofuran, and the wash liquors were mixed with the preceding filtrate. The solution was brought to dryness under vacuum to obtain O-methyl-N-methyl heparinamide which was employed as such for the following step.

This compound is not described in the literature.

*Step C: Preparation of the sodium salt of O-methyl-N-methyl heparinamide.*—The residue of Step B was taken up with 60 cc. of butanol saturated with water to form a clear yellow solution which was filtered through infusorial earth. The filter was rinsed twice with 20 cc. of butanol saturated with water which rinse solutions were re-added to the preceding filtrate. The butanolic solution was then extracted with an aqueous solution containing 20% sodium acetate and the aqueous extract was poured into 100 cc. of methanol. A white precipitate was formed which was allowed to stand at rest for a period of one hour and then the precipitate was filtered, washed with methanol and dried under vacuum to obtain 0.965 gm. of the sodium salt of O-methyl-N-methyl heparinamide.

The sodium salt of O-methyl-N-methyl heparinamide occurred in the form of a white amorphous powder which was soluble in water, dilute aqueous acids and dilute aqueous alkalis and insoluble in alcohol, ether, acetone, benzene and chloroform.

*Analysis.*—$(C_{61}H_{95}O_{69}N_8S_{11}Na_{11})_n$; molecular weight $=(2650)_n$. Calculated: C, 27.65%; H, 3.61%; N, 4.21%; S, 13.31%; $OCH_3$, 10.50%. Found: C, 28.2–28.5%; H, 3.9–3.8%; N, 4.0–4.1%; S, 12.0–12.2%; $OCH_3$, 8.3–8.2%.

The amount of methylation is at least 80%.

This compound is not described in the literature.

The compound had an anticoagulating activity of 3 UTA/mg. or 4.5 U/mg. (USP method).

PHARMACOLOGICAL STUDY OF THE SODIUM SALT OF O-METHYL-N-METHYL HEPARINAMIDE (A) *Determination of antilipemic activity*

[1] *Action on post-prandial lipemia in dogs.* (a) *After administration of the compound intravenously.*—An experimental hyperlipemia was induced in the dogs by the ingestion of 10 gm. per kg. of cream of fresh milk containing 38% fatty matter. Five hours after this lipidic surcharge, the dogs were separated into three lots. One lot served as control; one lot received intrevenously a dose of 10 γ/kg. of the sodium salt of O-methyl-N-methyl heparinamide previously dissolved in physiological serum and the third lot received under the same conditions a dose of 25 γ/kg. of the same salt.

3 cc. samples of blood were taken from all of the animals five hours after the ingestion of the fresh cream immediately before the administration of the medicine and at 5, 10, 20 and 30 minutes thereafter. The blood samples recovered over an anticoagulating agent were centrifuged. The plasma was separated and the determination of plasmatic turbidity was made on a Vernes photometer and expressed in optical densities, allowing the following of evolution of the lipemia. Table I summarizes the results obtained with the three lots of dogs.

TABLE I

| Lots | Dose received, γ/kg. | Plasmatic turbidity (in optical density) | | | | |
|---|---|---|---|---|---|---|
| | | Immediately before treatment | 5 min. | 10 min. | 20 min. | 30 min. |
| | | | After the treatment | | | |
| Controls | | 0.98 | 1 | 1.10 | 1.20 | 1.10 |
| Treated | 10 | 0.98 | 0.71 | 0.75 | 0.91 | 0.95 |
| | 25 | 0.98 | 0.68 | 0.61 | 0.78 | 0.80 |

The same test was repeated on the dogs by administering intravenously the said salt at doses of 50 and 100 γ/kg., four and a half hours after the ingestion of the fresh cream instead of five hours after. The results obtained are summarized in Table II.

TABLE II

| Lots | Dose received, γ/kg. | Plasmatic turbidity (in optical density) | | | |
|---|---|---|---|---|---|
| | | Immediately before treatment | 10 min. | 20 min. | 30 min. |
| | | | After the treatment | | |
| Treated | 50 | 0.98 | 0.62 | 0.73 | 0.73 |
| | 100 | 0.98 | 0.28 | 0.23 | 0.23 |

(b) *After administration of the medicine orally.*—A lipidic surcharge was induced in dogs by the ingestion of fresh cream under the same conditions as before. One group of dogs received only the fresh cream. Two other groups received orally 2 mg./kg. of the sodium salt of O-methyl-N-methyl heparinamide, administered in solution in physiological serum at the same time as the cream was administered. (The product was mixed with the cream.)

Blood samples were taken immediately after the treatment and the administration of the cream as well as three and five hour after. The blood was recovered on an anticoagulating agent and after centrifuging, the turbidity of the plasma was determined photometrically. The results are summarized in Table III.

TABLE III

| Groups of dogs | Dose received, mg./kg. | Plasmic Turbidity | | |
|---|---|---|---|---|
| | | 0 Hours | 3 Hours | 5 Hours |
| Controls | | 0.16 | 0.92 | 0.68 |
| Treated | 2 | 0.16 | 0.59 | 0.50 |

The data in Table III shows the clear effect exercised at the dose of 2 mg./kg. by O-methyl-N-methyl heparinamide between the third and the fifth hour following the ingestion of the fresh cream containing the said salt.

[2] *Liberation of the clarifying factor in dogs.*—2 mg./kg. of the sodium salt of O-methyl-N-methyl heparinamide were administered intravenously to a dog. The antilipemic activity was evaluated by measurement of the clarifying factor present in the blood of the animal 30 minutes and one hour after the injection of the said salt. The samples of the blood of the animal were recovered upon sodium citrate at the times as indicated above and these samples were centrifuged in order to separate the citrated plasma. 0.8 cc. of this plasma was placed in contact with 0.2 cc. of a dilution of Ediol containing 1 part per 1,000 (Ediol Schenlabs is a perfectly homogenous and stable emulsion of coconut oil).

The turbidity of the mixture was determined on a Vernes-Constant photometer first, after contact of the plasma with the Ediol, and then at increasing times of incubation on a water bath at 35° C. Similarly, the test was conducted with a sample of blood taken at 0 time, that is to say, immediately with the injection, which gives the information on the spontaneous evolution of the turbidity. The turbidities determined after the different times of incubation were, for each sample of blood plasma, expressed as a percentage of the initial turbidity of that sample (turbidity of the mixture of plasma and of Ediol after placing them in contact) and the results are summarized in Table IV, as obtained 30, 60, 90, 120 and 150 minutes of incubation of the blood samples recovered before the injection as well as 30 and 60 minutes after the injection.

TABLE IV

Evolution of plasmatic turbidity evaluated in percentage of the initial turbidity

| Blood samples | Time of incubation | | | | | |
|---|---|---|---|---|---|---|
| | 0 min. | 30 min. | 60 min. | 90 min. | 120 min. | 150 min. |
| Before injection_____percent__ | 100 | 89 | 89 | 90 | 89 | 90 |
| 30 min. after injection____do____ | 100 | 78 | 65 | 55 | 49 | 43 |
| 1 hour after injection_____do____ | 100 | 87 | 84 | 84 | 81 | 81 |

[3] *Liberation of fatty acids in the rabbit.*—This test was performed on normal rabbits who received an intravenous injection of 5 mg./kg. of O-methyl-N-methyl heparinamide.

Samples of blood were taken upon sodium citrate at 0° C. before the treatment and 30 minutes after. The free fatty acids were measured dosimetrically in the plasma by the method of Dole (J. of Clin. Investig., 1956, 35, 150) and expressed in M. equiv. of palmitic acid per liter of plasma. The dosages were determined on the two samples of plasma held at 0° C. and for the second sample after one, two, three and five hours of incubation at 37° C. The results are summarized in Table V.

TABLE V

| | Plasma recovered before treatment | Plasma recovered 30 minutes after the treatment—time of incubation | | | | |
|---|---|---|---|---|---|---|
| | | 0 Hr. | 1 Hr. | 2 Hr. | 3 Hr. | 5 Hr. |
| Amount of free fatty acid expressed in M. equiv./ liter of plasma | 0.40 | 0.52 | 0.72 | 1.06 | 1.22 | 1.24 |

(B) *Determination of immediate anticoagulating activity "in vitro"*

[1] *Antithrombic activity.*—The anticoagulating activity "in vitro" of the sodium salt of O-methyl-N-methyl heparinamine was determined according to the method described by Herbain (Bull. Soc. Chim. Biol. 1958, 40, 1221). According to this method, a reactant plasma deprived of calcium and prothrombine was prepared and by adding some thrombine to the plasma, the fibrinogen which it contained was transformed into fibrin which produced simultaneously a coagulation and an opacification. The previous addition of an anticoagulant such as heparine provokes a slowing of the coagulation as well as of the opacification. If the time necessary in order to reach a given value of the opacity is measured, it is observed that there exists a relation between this time and the anticoagulating activity of the preparation. The values obtained were compared to those found with a titrated solution of standard heparine and were expressed arbitrarily in antithrombic units (A.T.U.).

Results: A.T.U./mg.
Standard heparine (sodium salt) _____ 130–140
Sodium salt of O-methyl-N-methyl heparinamide _____ 3

[2] *Anticoagulating activity according to the method of the U.S. Pharmacopeia (U.S.P. XV).*—The immediate anticoagulating activity "in vitro" of the said sodium salt was determined with reference to heparine which was taken as a reference substance.

Results: U.I./mg.
Standard heparine sodium salt _____ 130–140
Sodium salt of O-methyl-N-methyl heparinamide _____ 4.5

These two determinations clearly show that the anticoagulating effect of the sodium salt of O-methyl-N-methyl heparinamide is practically negligible.

(C) *Determination of toxicity*

[1] *Orally.*—The sodium salt of O-methyl-N-methyl heparinamide in aqueous solution was administered to a group of ten mice having an average weight of 20 gm. at a dose of 500 mg./kg. After eight days of observation, no symptons whatever nor any mortality was noted.

[2] *By intravenous methods.*—The said sodium salt in aqueous solution was injected into a group of mice having an average weight of 20 gm. at a dose of 200 mg./kg. After eight days of observation, no symptons nor mortality was noted.

Various modifications of the compositions and process of the invention may be made without departing from the spirit or scope thereof and it is to be understood that the invention is to be limited only as defined in the appended claims.

I claim:
1. A compound selected from the group consisting of O-methyl-N-methyl heparinamide and its alkali metal salts.
2. O-methyl-N-methyl heparinamide.
3. The sodium salt of O-methyl-N-methyl heparinamide.
4. A process for the preparation of O-methyl-N-methyl heparinamide which comprises reacting N-methyl heparin- amide with a high molecular weight quaternary ammonium compound to form the corresponding quaternary ammonium salt of N-methyl heparinamide and reacting the latter in an inert organic solvent with a methyl halide in the presence of a halide precipitant to form O-methyl-N-methyl heparinamide.

5. The process of claim 4 wherein O-methyl-N-methyl heparinamide is reacted with an alkali metal salt of a lower aliphatic carboxylic acid to form the corresponding alkali metal salt of O-methyl-N-methyl heparinamide.

6. The process of claim 4 wherein the quaternary ammonium compound is benzyldimethyl-2-[2-(p-1,1,3,3-tetramethylbutylphenoxy)-ethoxy]-ethyl ammonium chloride.

7. The process of claim 4 wherein the methyl halide is methyl iodide and the halide precipitant is silver oxide.

8. A process for the preparation of O-methyl-N-methyl heparinamide which comprises reacting N-methyl heparinamide with aqueous benzyldimethyl-2-[2-(p-1,1,3,3-tetramethylbutylphenoxy)-ethoxy]-ethyl ammonium chloride to form the corresponding quaternary ammonium salt of N-methyl heparinamide and reacting the latter in tetrahydrofuran with methyl iodide in the presence of silver oxide to form O-methyl-N-methyl heparinamide.

9. The process of claim 8 wherein O-methyl-N-methyl heparinamide is reacted with aqueous sodium acetate to form the sodium salt of O-methyl-N-methyl heparinamide.

10. Antilipemic compositions comprising a compound selected from the group consisting of O-methyl-N-methyl heparinamide and its alkali metal salts and a major amount of a pharmacological carrier.

11. The compositions of claim 10 wherein the compound is the sodium salt of O-methyl-N-methyl heparinamide.

No references cited.

JULIAN S. LEVITT, *Primary Examiner.*